United States Patent [19]

Schmelz et al.

[11] 4,192,840
[45] Mar. 11, 1980

[54] METHOD FOR PRODUCING A CAPACITOR DIELECTRIC WITH INNER BLOCKING LAYERS

[75] Inventors: Helmut Schmelz, Prien; Werner Schwaen, Munich, both of Fed. Rep. of Germany

[73] Assignee: Siemens Aktiengesellschaft, Berlin & Munich, Fed. Rep. of Germany

[21] Appl. No.: 908,665

[22] Filed: May 23, 1978

Related U.S. Application Data

[62] Division of Ser. No. 815,579, Jul. 14, 1977, Pat. No. 4,131,903.

[30] Foreign Application Priority Data

Aug. 3, 1976 [DE] Fed. Rep. of Germany ....... 2634896

[51] Int. Cl.$^2$ ...................... C04B 19/04; G04B 33/32
[52] U.S. Cl. ...................................... 264/61; 252/520; 264/66
[58] Field of Search .................. 264/61, 65, 66, 104, 264/105; 106/46; 317/238; 252/520

[56] References Cited

U.S. PATENT DOCUMENTS

| | | | |
|---|---|---|---|
| 2,277,733 | 3/1942 | Wainer et al. | 106/46 |
| 2,277,734 | 3/1942 | Wainer et al. | 106/46 |
| 2,277,736 | 3/1942 | Wainer et al. | 106/46 |
| 3,441,517 | 4/1969 | Brauer et al. | 252/520 |
| 3,569,802 | 3/1971 | Brauer | 264/66 |
| 4,131,903 | 12/1978 | Schmelz et al. | 357/10 |

FOREIGN PATENT DOCUMENTS

| | | | |
|---|---|---|---|
| 1047057 | 11/1966 | United Kingdom | 264/66 |
| 1104236 | 2/1968 | United Kingdom | 252/520 |
| 1104237 | 2/1968 | United Kingdom | 252/520 |
| 1186116 | 4/1970 | United Kingdom | 252/520 |

OTHER PUBLICATIONS

"Resistance Anomaly in Semiconductor BaTiO$_3$ Ceramic in the Range Under Curie Temp.", by H. Brauer, vol. 17, 1974, Solid State Electronics, pp. 1013–1019.

*Primary Examiner*—Donald J. Arnold
*Attorney, Agent, or Firm*—Hill, Van Santen, Steadman, Chiara & Simpson

[57] ABSTRACT

A capacitor dielectric with inner blocking layers is disclosed wherein the portion of copper located in intermediate layers between the crystallites is enriched toward the crystallite surfaces. The dielectric is produced by a heating speed of 200° to 800° C./h towards a sinter temperature, and a cooling-off speed of 10° to 100° C./h to about 350° C. below the sinter temperature.

9 Claims, 5 Drawing Figures

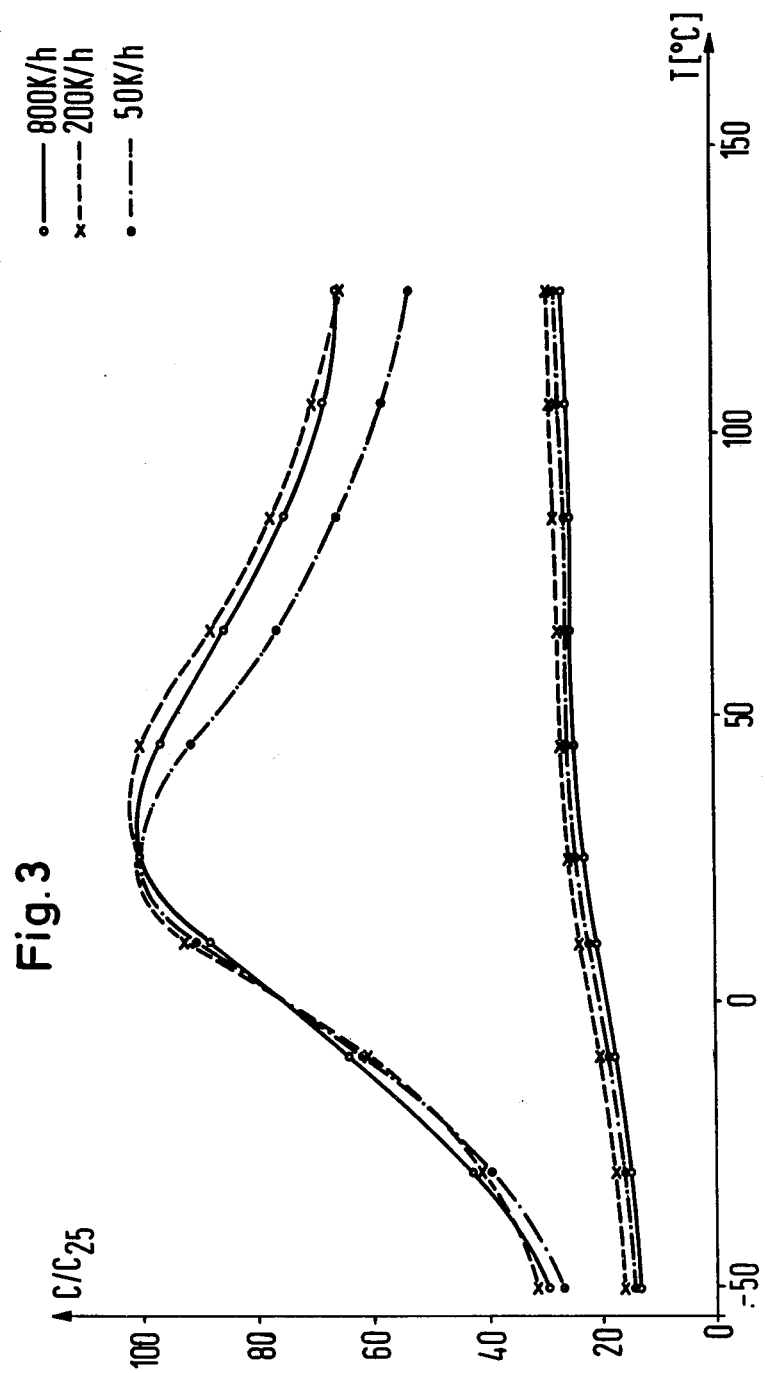

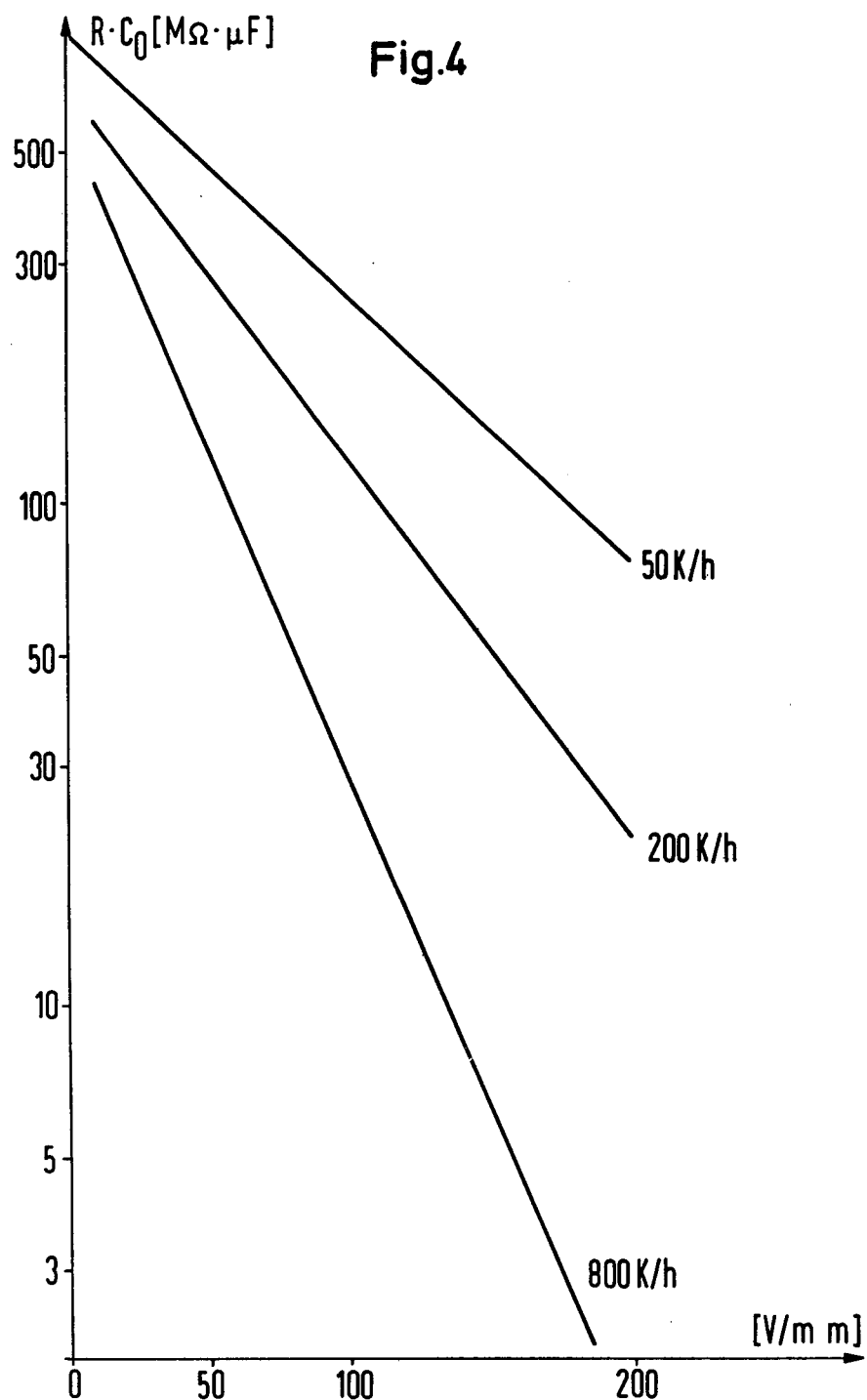

METHOD FOR PRODUCING A CAPACITOR DIELECTRIC WITH INNER BLOCKING LAYERS

This is a division of application Ser. No. 815,579, filed July 14, 1977 now U.S. Pat. No. 4,131,903.

BACKGROUND OF THE INVENTION

The invention relates to a capacitor dielectric with inner blocking layers consisting of a polycrystalline ceramic body of a material with a perovskite structure on the basis of barium titanate with the general formula $$(Ba_{1-x}M_x^{II})O \cdot z(Ti_{1-y}M_y^{IV})O_2$$

with $M^{II}$=Ca, Sr, Ph and/or Mg and $M^{IV}$=Zr, Sn and z assuming the values 1.005 to 1.05. The material contains at least two different doping substances one of which is preferably antimony, niobium, lanthanum or bismuth inside the crystallites and which causes predominantly n-type conduction; and the other, preferably copper, cobalt, nickel, iron or manganese in the surface layer of the crystallites and which causes predominantly p-type conduction. The proportion of the doping substance causing the n-type conduction is 1.5 to 2.5 times greater than the maximum doping quantity and the proportion of the substance causing the p-type conduction amounts to 0.01 to 0.15% by weight.

Such a capacitor dielectric is described in German published specification No. 1 614 605 and in the corresponding Great Britain patent specification No. 1 204 436 and U.S. Pat. No. 3,569,802.

One capacitor dielectric disclosed in these specifications has been commercially available for several years under the name SIBATIT 50.000 (SIBATIT, a registered trade mark) and has been technically proven many times. This capacitor dielectric can be used in the form of disks, tubes with circular and rectangular cross-section which are provided with metallic coatings (e.g. silver) as electrodes, and in the form of so-called "stack capacitors." Stack capacitors are capacitors in which thin layers of dielectric material are disposed one on another in alternate fashion with metallic layers extending to the edge alternately on different sides.

In order to insure maximum conductivity inside the grain in the simultaneous presence of the p-type doping substance despite the proportions of n-type doping substance being higher than those normally needed for maximum conductivity (maximum) doping), the above described specification proposes by way of preferred production processes that all substances be made to react together in oxide form. In such a case the conductivity inside the crystallite grains attains the highest possible values, while the p-type doping substance, particularly the copper (which can only be incorporated in the perovskite crystal lattice to a limited degree, if at all,) is essentially incorporated in the surface layer of the crystallites.

A ceramic material is described in British patent specification No. 1 047 057 as a capacitor dielectric which consists of a polycrystalline body of semi-conducting barium titanate and is made by applying substances such as iron, cobalt, manganese, copper among others on the surface of the body, whereupon the body thus prepared is heated. In the process, the named elements at the boundaries of the grains diffuse into the ceramic body along the grain boundaries therein. The semi-conducting properties of the barium titanate ceramic element are obtained through the body being made semiconducting either by reduction in a vacuum or in hydrogen gas or through bringing about so-called valency controlled semi-conduction by n-type doping substances. With the known capacitor dielectric and the method of production specified for it, the rate of diffusion plays a decisive part, and the diffusion process is relatively difficult to control. In addition it should be noted that with this method one first has to produce the semi-conducting body which then has to be brought into contact with the diffusion metals in further operational stages and subjected to heating to bring about the diffusion. The known method is unsuitable for the reproducibility required in mass production.

When one speaks of values for the dielectric constant (DK) in connection having a capacitor dielectric with inner blocking layers, one is always referring to apparent DK values, since establishing the DK from measurement of the capacitance of such a capacitor depends on the body as a whole having a high $\epsilon$, whereas in fact only the very thin p-n junctions at the grain boundaries become dielectrically effective. These grain boundaries exhibit a normal DK value for barium titanate but a DK which is increased many times results because of the reference to the casing as a whole.

In a capacitor dielectric the DK is not alone in playing a part with respect to capacitance level, for it is also necessary that the dependence of DK upon operating temperature, the tangent of the loss angle (loss factor), and the insulation and thus the charging capacity of the capacitor remain within certain limits.

This is largely already the case with the known capacitor dielectrics having inner blocking layers indicated above.

However efforts are being made both to improve the electrical properties and to obtain even more consistent reproducibility of these electrical values in mass production.

The time constant which is defined as the product of the capacitance of the capacitor and its insulation resistance expressed in $M\Omega \cdot \mu F$ or, after conversion, in seconds, is regarded as a measurement of the improvement in the electrical properties of electrical capacitors.

The time constant should always be indicated together with the value for the field strength at which measurement is made since both the capacitance and the insulation capacity depend upon the prevailing field strength.

Known blocking layer capacitors with inner blocking layers have time constants between 20 and 70 sec at a field strength of 100 V/mm and 2 to about 20 sec at a field strength of 200 V/mm.

In the present connection the improvement in the reproducibility of the electrical values in mass production means that the electrical values are obtained with reduced spreading when bodies having the same initial composition and undergoing the same preliminary treatment are sintered in different ovens, for instance.

SUMMARY OF THE INVENTION

An object of the present invention is to provide a capacitor dielectric with inner blocking layers in which the time constant (RC product) and thus the voltage strength and continuous charging capacity are raised. It is also an object of this invention to improve reproducibility.

In accordance with the invention, between the crystallite grains of the ceramic capacitor dielectric there is disposed titanate intermediate phase rich in titanium dioxide, which phase is at least partially recrystallized and contains the p-type doping substance distributed inhomogeneously such that the p-type doping substance is considerably more concentrated towards the crystallite grain surfaces.

Preferred capacitor dielectrics consist of BaO(-Ti$_{0.85}$Sn$_{0.15}$)O$_2$ with 0.025 TiO$_2$ and 0.2% by weight of Sb$_2$O$_3$ and 0.0535% by weight of CuO, the surplus of tetravalent components over divalent ones being given by 0.025 TiO$_2$ for instance, or of BaTiO$_3$ with 0.03 TiO$_2$ and 0.15% by weight of Sb$_2$O$_3$ and 0.04% by weight of CuO.

Experiments leading to the present invention have shown that the titanate intermediate phase between the crystallite grains, in which titanium is enriched by the surplus of tetravalent metals and which causes some degree of vitrification of the entire body with very thin intermediate layers, leads to the formation of very limited p-n junctions on the crystallite grain surfaces when the p-type doping substance, in particular the copper, is enriched towards the intermediate phase-crystallite grain surface interfaces. A simple, almost homogeneous distribution of the p-type doping substance in the surface layers of the crystallite grains still allows excessively wide variation in the p-n junction. Even diffusing a p-type doping substance into a finished ceramic body leads at best to a homogeneous distribution of the p-type doping substance in the intermediate layers that may be present.

The advantage obtained with the invention consist in the fact that the time constant can be raised to values of between 40 and 150 sec at field strengths of 250 to 50 V/mm, while at the same time the reproducibility is improved as seen in the reduction of the spread of electrical values to at least half the former tolerance ranges.

With the aid of analytical direct X-ray photographs and using the micro probe method of establishing the spread of individual elements in a body, one can demonstrate that with the capacitor dielectrics in accordance with the invention the enrichment of the copper ions is actually present at the intermediate phase/crystallite grain surface interface.

The micro probe analysis method is described by L. S. Birks in the book "Electron Probe Micro Analyses," 1963, Interscience publishers, and consists in passing a micro probe over a face of the body to be examined and the amount of a selected element contained in a specific selection of grains, here copper for example, is determined. An idea of the composition in question is given with a fine direct X-ray analysis by measuring the lattice constant and modification thereof with substitution elements.

The method of producing a capacitor dielectric in accordance with the invention consists in mixing the starting components needed to make the body in oxide form or in a form yielding the oxides or in a form giving the titanates. Thereafter they are ground down in wet or dry form and then a solid reaction at 950° to 1100° C. is brought about as is described in German published specification No. 1 614 605 corresponding to U.S. Pat. No. 3,569,802, after which the reaction product is again ground down to the desired particle size (0.1 . . . 2 μm) and the powder is converted into the grains by pressure or by slip-casting and these undergo sintering at temperatures of between 1250° C. and 1450° C., producing crystallite grains of between 20 and 300 μm, preferably 50 μm.

In accordance with the present invention the sintering process is carried out for the purposes of separating the copper ions in the intermediate phase, preferably in the vicinity of the surfaces of the crystallite grains, such that the pressed grains are first heated up to the sintering temperature with a heat-up speed of 200° K./h (°C./h) to 800° (°C./h) K./h at least over the temperature range from 100° C. to the sintering temperature, then kept at the sintering temperature for 1 to 4 hours, then slowly cooled from the sintering temperature down to at least 100° K. and around 350° K. below the sintering temperature, i.e. at a speed of between 10° K./h and 100° K./h, after which the remaining cooling down to the normal temperature takes place according to the cooling conditions peculiar to the sintering oven itself.

A ceramic body having the basic composition of 1 mole BaO, 0.875 mole TiO$_2$, 0.15 mole SnO$_2$ and additives of 0.2% by weight of Sb$_2$O$_3$ and 0.0535% by weight of CuO are heated for the sintering process at a rate of 600° K./h, are kept at the sintering temperature of 1380° C. for three hours, and are then cooled at a rate of 50° K./h to 1100° C.

These very tight conditions imposed on the entire sintering process which comprises both the sintering and the cooling period guarantee that the spread of the electrical values in the finished body is reduced to an acceptable minimum.

The relatively high heat-up speed means that the grain growth in the pressed body is severely restricted, sintering temperature and time insure that the intermediate phase is separated, and the p-type doping substance accumulates in the intermediate phase. The relatively slow cooling makes sure that the intermediate phase has enough time for recrystallization, the recrystallization taking place under favorable conditions at the intermediate phase/crystal grain surface interface and consequently insuring enrichment of the p-type doping substance, in particular the copper ions, at that point.

U.S. Pat. Nos. 2,277,733, 2,277,734 and 2,277,736 describe sintering processes for capacitor dielectrics consisting of up to 80% titanium dioxide at least in which the heat-up takes place relatively slowly, namely at 10° K./h for the temperature range from normal temperature up to 985° C., and at 38° K./h for the temperature range from 985° up to 1260° C. (sintering temperature) with relatively long periods of 6 hours during which the sintering temperature is maintained, after which cooling between 1260° C. and 985° C. takes place at a rate of 38° K./h. Thereafter the cooling conditions of the sintering oven take over. In these known capacitor dielectrics this sintering process serves in particular to insure satisfactory vitrification and avoid the tendency towards crystallization and in addition to make the body less porous and reduce the effect of impurities.

In contrast, the purpose of the process for the present invention is to promote recrystallization and in particular to make the influence of the impurities more marked—for the added p-type doping substances constitute impurities in the perovskite lattice.

In the invention, different sintering processes are used to produce different results.

BRIEF DESCRIPTION OF THE DRAWINGS

FIGS. 1 to 4 are graphs of electrical properties for the material of the capacitor as shown in the table as the sintering process is changed.

DESCRIPTION OF THE PREFERRED EMBODIMENTS

Specimens in the form of disk-shaped elements were used, these having been made in the known manner by preburning, repeated grinding and pressing.

The sample composition per mole BaO was 0.875 mole $TiO_2$ and 0.15 mole $SnO_2$ and in addition—relative to the weight of the sample formulation—0.20% by weight of $Sb_2O_3$ and 0.0535% by weight of CuO.

Figure 1:
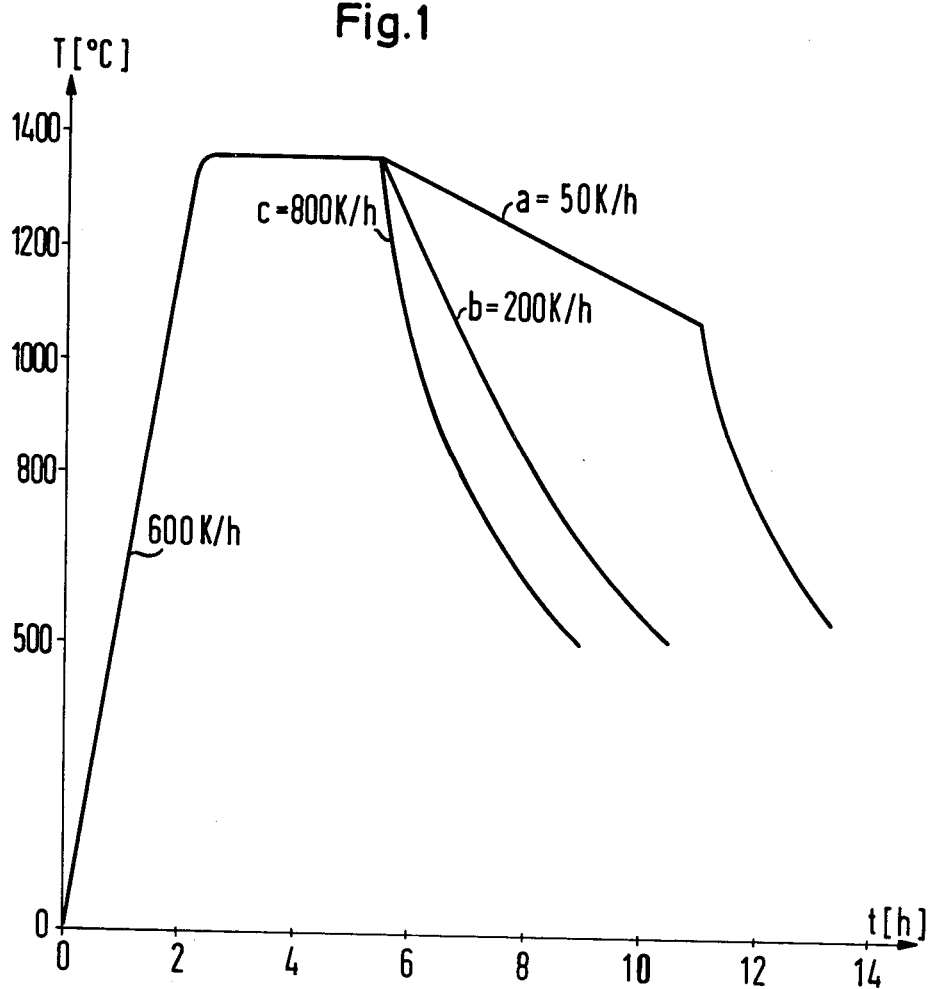

Sintering was carried out in air or in an oxidizing atmosphere with a heat-up rate of about 600° K./h. The sintering temperature was varied between 1340° and 1380° C., the time for which this was maintained being three hours in each case. Three different rates of cooling were used in each case, namely 50°, 200° and 800° K./h. Adherence to and reproducibility of the selected sintering programs (heat-up rate, sintering temperature, time over which the temperature was maintained, and cooling rate) was insured by electronic control with time pattern apparatus so that the sintering programs shown in FIG. 1 could be carried out. The heat-up and maintenance time portion of the curves was the same for all three programs while the cooling conditions given by curves a, b and c relate to 50°, 200° and 800° K./h respectively. The time in hours is plotted on the abscissa and the temperature in °C. on the ordinate.

The cooling rate of 800° K./h could only be maintained down to about 1200° C. as this becomes restricted below this temperature by the thermal capacity of the vertical oven. The cooling rate of 50° K./h was interrupted at 1100° C. for reasons of time. In this connection, it is assumed that the recrystallization has ended at this temperature. At all the cooling rates the best electrical values was obtained with sintering temperatures between 1355° and 1365° C. The electrical values obtained from these sintering operations are collated in table I.

The values of the blocking layer capacitors known to data with inner depletion layers are roughly comparable with the values obtained with cooling at 200° K./h.

Figure 2:
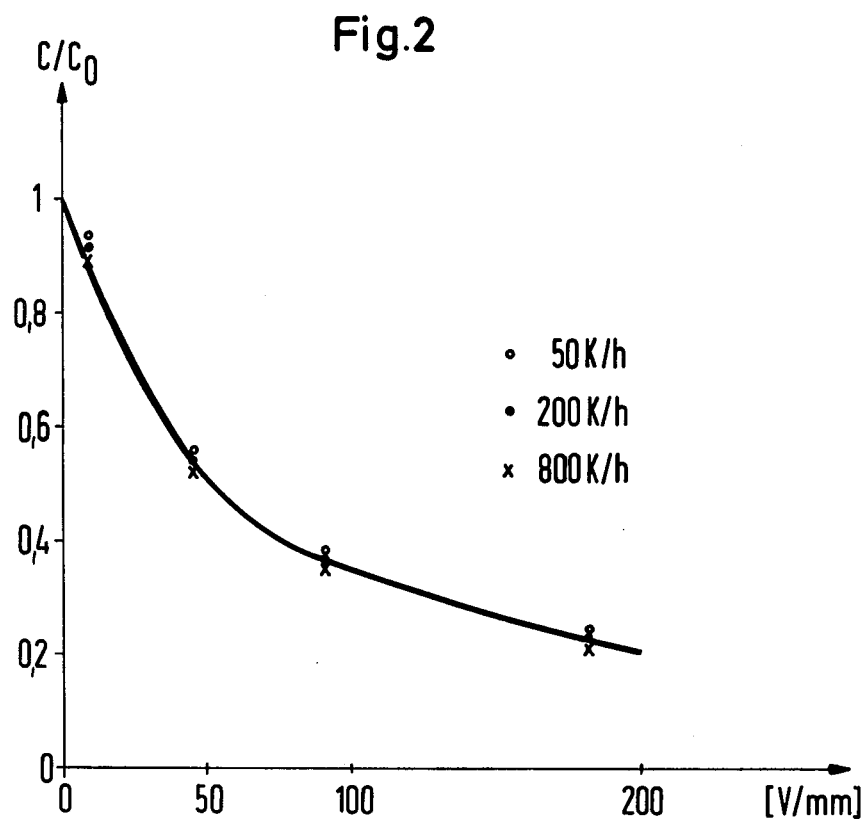

FIG. 2 shows the direct-voltage dependence of the capacitance of disk capacitors at 1 KHz and 25° C. under different cooling conditions.

The temperature relationship of the capacitance is shown in FIG. 3 in which the lower curves are valid for a superimposed constant field of 200 V/mm. The capacitance was measured at 1 KHz in relation to the cooling rate with and without a superimposed constant field and the sintering temperature for the specimens at 1360° C.

FIG. 3 shows that with slow cooling, the temperature relationship of the capacitance, i.e. the dependence of capacitance on different temperatures, becomes somewhat greater. It appears as if the Curie maximum is somewhat more marked insofar as this can actually be established within the limits of the spread.

Tables 1 and 2 show a drop in the permitivity and a simultaneous rise in insulation as the cooling rate falls. The RC product of insulation resistance and capacitance is important in assessing a capacitor. Particularly with fairly strong fields (flat tube with 0.35 mm thick wall at 63 V $\triangleq$ 180 V/mm) a clear improvement in the RC product becomes apparent as the cooling rate falls. This can be seen in FIG. 4 in which the dependence of the RC product on the field strength and the cooling rate is shown. Because of the improved time constant one can also expect an improvement in the behavior under continuous testing.

The cooling rate is also dependent to a certain extent on the actual composition of the mass; however this relationship can be established rapidly in simple tests. Thus, cooling rates of between 10° K./h and 100° K./h are optimal depending on the mass composition. It is also conceivable that repeating the recrystallization process several times brings a further improvement.

The loss factor and the direct-voltage relationship are hardly affected at all by the cooling rate.

Figure 5:
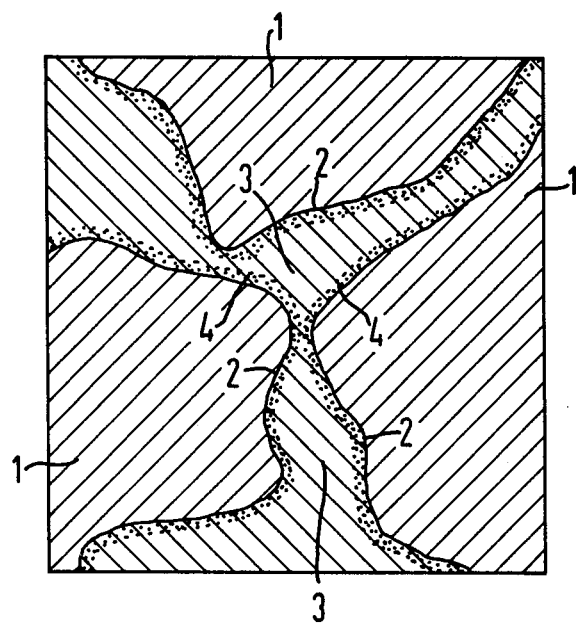
FIG. 5 diagrammatically shows the result of a micro probe examination.

FIG. 5 is a diagrammatic illustration of the conditions inside a ceramic dielectric with inner blocking layers as found and definable using miro probe analysis. FIG. 5 shows three n-type conducting grains 1 with their grain surfaces 2. The titanium-rich intermediate phase 3 lies between the grains 1. Copper ions 4 are enriched at the intermediate phase 3/grain surface 2 interface. The p-n junctions which have a capacitive effect when a voltage is applied form in the area of the grain surface 2.

The production of the capacitor dielectrics in accordance with the invention and the execution of the process in accordance with the invention are possible both in vertical ovens and in continuous ovens. In the case of vertical ovens, the program for the sintering process is controlled and maintained with time pattern apparatus, Table I Electrical Values (Mean Values) for $Ba(Ti_{0.875}Sn_{0.15})O_3$ + 0.15% by weight of $Sb_2O_3$ + 0.0535% by weight of CuO as a function of the Cooling Speed (Sintering 1360° C.; maintained for 3 hours), measured on Disks of about 11.5 mm in diameter and about 1.1 mm in thickness

| Cooling rate | E | tan δ (1kHz) ($\times 10^{-3}$) | tan δ (100kHz) ($\times 10^{-3}$) | R[MΩ] (10V) ($\times 10^4$) | R[MΩ] (50V) ($\times 10^4$) | R[MΩ] (100V) ($\times 10^3$) | R[MΩ] (200V) ($\times 10^3$) |
|---|---|---|---|---|---|---|---|
| 800° K/h | 90,000 | 38 | 95 | 0.6 | 0.13 | 0.31 | 0.044 |
| 200° K/h | 75,000 | 38 | 92 | 1 | 0.6 | 2 | 0.48 |
| 50° K/h | 60,000 | 38 | 91 | 1.6 | 1.2 | 6 | 2 |

Table 2

Electrical Values (Mean Values) for $BaTiO_3$ + mole $TiO_2$ + 0.15% by weight of $Sb_2O_3$ + 0.04% by weight of CuO as a function of the Cooling Speed (heat-up speed 200° K/h), Sintering 1360°, maintained for 3 hours, measured on disks of about 11.5 mm in diameter and about 1.1 mm in thickness

| Cooling rate to 1100° C. | E | tan δ (1kHz) ($\cdot 10^{-3}$) | RC (100 V/mm) | RC (300 V/mm) |
|---|---|---|---|---|
| 200° K/h | 22 000 | 20 | 100 MΩ · μF | 4 MΩ · μF |
| 50° K/h | 20 000 | 20 | 300 MΩ · μF | 40 MΩ · μF | while in the case of continuous ovens, the program for the sintering process is realizable through the variation between the individual zones. Fast heat-up rates require a short zone for transition from the normal to the sintering temperature, while conversely, slow cooling also requires a zone of corresponding length in the oven. With continuous ovens the feed through speed is in itself the same so that here the individual zones through which the elements to be sintered will pass have to be suitably long or short.

Another result of the present invention is to reduce the production costs through higher yields or reduced scrapping levels when the teachings of this invention are followed.

Although various minor modifications may be suggested by those versed in the art, it should be understood that we wish to embody within the scope of the patent warranted hereon. all such embodiments as reasonably and properly come within the scope of our contribution to the art.

We claim as our invention:

1. A method for producing a capacitor dielectric with inner blocking layers formed of polycrystalline ceramic bodies made of a material with a perovskite structure on the basis of barium titanate and containing at least two different doping substances, one of the substances causing n-type conduction inside crystallites of the crystalline bodies and the other causing p-type conduction in a titanate intermediate phase disposed between grains of the crystallites, comprising the steps of:
   (a) mixing starting components needed to make the bodies;
   (b) grinding the components and reacting said components to produce a solid reaction product at 950° C. to 1100° C.;
   (c) again grinding down the reaction product to a powder of desired particle size;
   (d) forming the bodies from the powder and an inorganic binder by pressing and then subjecting the bodies to sintering in a sintering oven at 1250° to 1450° C.;
   (e) promoting the influence of p-type doping substances by separting the p-type doping substances in the intermediate phase in the vicinity of the surfaces of the crystallite grains and at least partially recrystallizing by conducting said sintering of step (d) such that the bodies are first heated up to the sintering temperature at a heat-up rate of 200° K./h (°C./h) to 800° K./h at least in the temperature range from 1000° C. to the sintering temperature, maintaining the bodies at the sintering temperature for one to four hours, then slowly cooling the bodies down from the sintering temperature to at least 100° K. and some 350° K. below the sintering temperature at a rate of between 10° K./h and 100° K./h, after which remaining cooling to normal temperature is effected related to actual cooling conditions peculiar to the sintering oven being employed.

2. The method of claim 1 in which the starting components are mixed in oxide form.

3. The method of claim 1 in which the starting components mixed are in a form supplying oxides during heating.

4. The method of claim 1 in which the starting components mixed are in a form supplying titanates during heating.

5. The method of claim 1 in which the bodies are formed from the powder by pressure.

6. The method of claim 1 in which the bodies are formed from the powder by a slip casting process.

7. The method of claim 1 in which the p-type doping substances separated are copper ions.

8. A method as in claim 1 for the production of a capacitor dielectric in which the bodies formed from the powder are pressed and have a basic composition of 1 mole BaO, 0.875 mole TiO$_2$, 0.15 mole SnO$_2$ and additives of 0.2% by weight of Sb$_2$O$_3$ and 0.0535% by weight of Cu, said pressed bodies being heated up for the sintering at 600° K./h, kept at sintering temperature of 1380° C. for three hours, and then cooled at a rate of 50° K./h down to 1100° C.

9. A method as in claim 1 for the production of a capacitor dielectric in which the bodies formed from the powder are pressed and have a basic composition of 1 mole BaO, 1.03 mole TiO$_2$ and additives of 0.15% by weight of Sb$_2$O$_3$ and 0.04% by weight of CuO, said pressed bodies being heated up for the sintering at 200° K./h, kept at the sintering temperature of 1360° C. for three hours, and then cooled down to 1100° C. at a rate of 50° K./h.

* * * * *